Oct. 27, 1959 B. E. HARDGROVE ET AL 2,910,666
HELICAL RANGE RECORDER
Filed Dec. 5, 1952 2 Sheets-Sheet 1

INVENTORS
BASIL E. HARDGROVE
RUDOLPH M. HAISFIELD

BY
ATTORNEYS

Oct. 27, 1959  B. E. HARDGROVE ET AL  2,910,666
HELICAL RANGE RECORDER
Filed Dec. 5, 1952  2 Sheets-Sheet 2

INVENTORS
BASIL E. HARDGROVE
RUDOLPH M. HAISFIELD

BY
ATTORNEYS

United States Patent Office 2,910,666
Patented Oct. 27, 1959

2,910,666
HELICAL RANGE RECORDER

Basil E. Hardgrove, Silver Spring, Md., and Rudolph M. Haisfield, Washington, D.C., assignors to the United States of America as represented by the Secretary of the Navy Application December 5, 1952, Serial No. 324,432

4 Claims. (Cl. 340—5)

(Granted under Title 35, U.S. Code (1952), sec. 266)

The present invention relates in general to recorders and more particularly to sonic distance recorders for recording varying distance or range as in underwater echo ranging and depth finding.

The conventional recorders for echo ranging make use of a pointed stylus which travels along a record sheet with a uniform scanning movement to record lapsed time between the projection of an incident sound energy pulse and the arrival of its echo at a given point of reception from a given reflecting object. At the end of its given length of travel the stylus is caused to return rapidly to its starting or zero position which movement is called the fly-back. Because the time of travel of the recording stylus from start to end of the scanning limit for maximum range is several seconds and the next pulse cannot be projected until after completion of the preceding scanning movement, the pulse rate for short ranges is limited to that required for maximum range unless the scanning limit can be shortened by causing the fly-back to occur earlier in the scanning movement of the stylus. Variable fly-back is therefore provided and is usually accomplished by use of a spring arranged to be tensioned during forward movement of the stylus along a straight trackway in the form of a pair of parallel rods. Such mechanism including a light cable for pulling the stylus along in its scanning movement, is difficult to protect against shock and vibration and is susceptible to faulty operation due to accumulation of dust and other deposits on the trackway of the movable stylus. Another disadvantage is a high rate of wear and erosion of the stylus point.

In the type of recorder known as a helical recorder, currently used mostly in facsimile machines, susceptibility to damage or faulty operation due to shock and vibration is relatively low and elimination of the pointed stylus and stylus trackway removes the disadvantages incident to their use.

However, in its present form, the helical-recorder lacks the variable fly-back feature of the sliding stylus type which renders the helical type unsuitable for sound echo ranging where fly-back to the zero or starting point is desirable shortly after receipt of an echo, in short ranging, to avoid delay incident to completion of a long range scanning cycle.

An object of the present invention is the provision of a helical recorder having a constant scanning rate for accurate recording of time interval, with variable fly-back, whereby duration of scanning cycle may be varied to vary the scanning repetition rate with variation in range, to permit a higher repetition rate for shorter ranges without variation in the scanning rate or time base.

Various other objects and advantages of the present invention will become apparent from a perusal of the following specification and the drawings accompanying the same.

Figure 1:
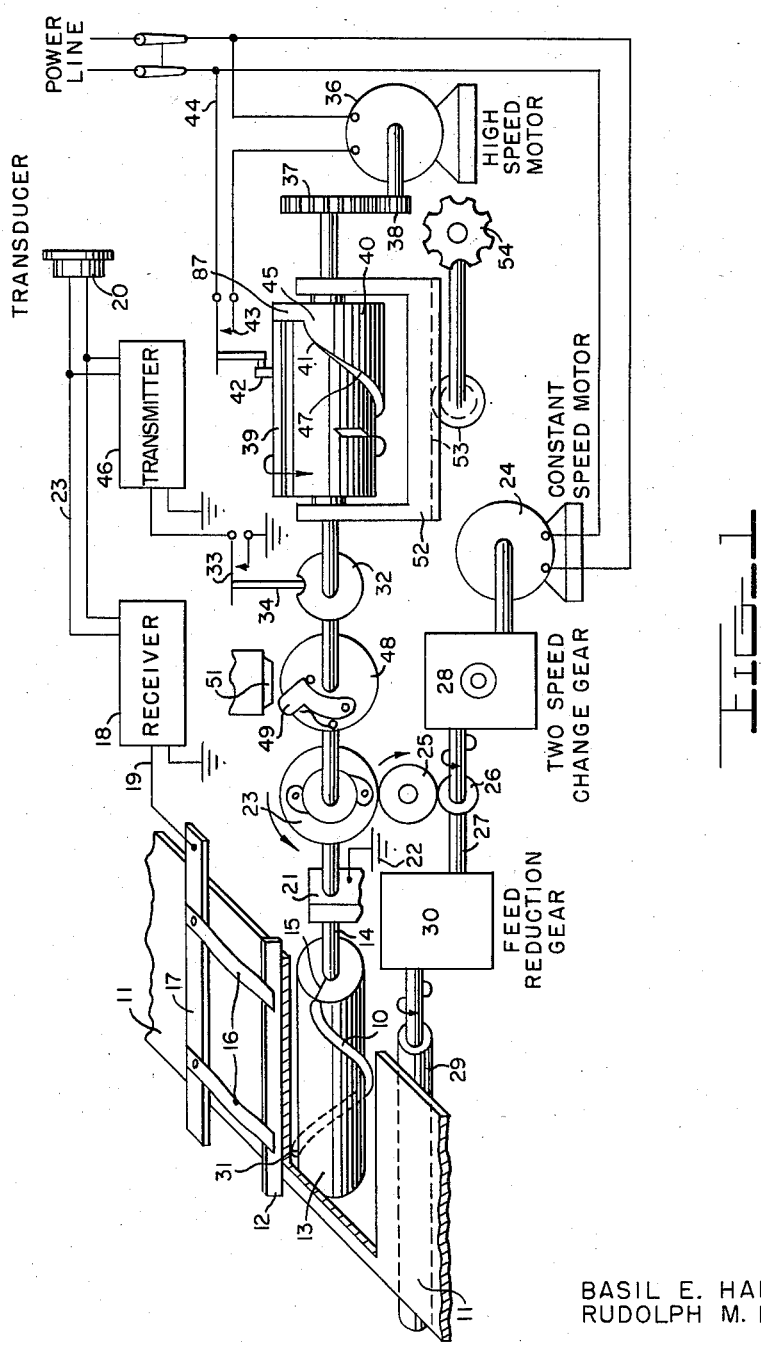
Figure 1 is a diagrammatic illustration of an embodiment of the invention using separate sources of motive power for the scanning and fly-back movements.

Referring to the diagrams in detail and first to Figure 1, here the helical recorder is of the electrolytic or chemical type and comprises the usual cylindrical, helical scanning element 10 mounted to rotate about its axis with a record sheet 11 interposed between it and an electrode bar 12 and in contact with the bar and the helix. The helix, of slightly less than one convolution, say of the order 335 degrees or more, for a purpose to be later described, is mounted on the mandrel 13 for rotation with the latter by the shaft 14 of electrical conducting material, the helix being electrically connected to the shaft through a suitable conductor element 15. For the sake of a clear showing of the helix and its supporting mandrel, the record sheet is here shown with a large rectangular section cut away where it passes in front of the helix. A pair of leaf springs 16 supported on frame member 17 maintain the electrode bar 12 in contact with the record sheet and the record sheet in contact with the helix immediately below the bar. The record sheet may be of any known or other suitable type capable of producing a visible record mark in response to passage of signal current through the sheet between the bar and the helix at the point of contact between the sheet and helix immediately below the bar. As is known in the art, according to the type of record paper used, the record marks will vary in size or intensity of color or both in proportion to the intensity of signal current. This enables one, after observing several scanned lines of the record, to distinguish a definite target. Signal output current from a receiver 18 is conducted through conductor 19, frame member 17, bar 12, record sheet 11, helix 10, shaft 14 and a frame member 21 to ground return 22. Input signals are supplied to the receiver over input line 23 from transducer 20, which may be of any known or other suitable type capable of acting either as a receiver or projector of underwater compressional wave energy.

Rotation of shaft 14 at a constant predetermined speed is effected through an overdrive gear 23 receiving motion in the direction indicated by the adjacent arrow from a constant speed motor 24 through idler 25, gear 26, shaft 27 and a two-speed change gear 28. The two speeds enable the scanning rate to be changed from a relatively slow rate for maximum range to a higher rate for medium ranges. In a practical embodiment of the invention using a helix with a pitch of about 5 inches the slow rotational speed was about 12 r.p.m. and the higher speed about 30 r.p.m. Feeding of the record sheet at constant ratio to the rate of rotation of the helix and consequently at a constant ratio to the scanning speed, is accomplished through the feed roller 29 driven through a suitable feed reduction gear 30 from the two-speed change gear output shaft 27 common to both record feed and scanning mechanism.

Where maximum length scanning is used as in full range recording, continuous rotation of the helix from the position shown in the drawing through one complete revolution, again brings the point of contact of the helix with the record sheet to starting or zero position 21. This occurs shortly after the extreme right hand end of the helix has moved toward the observer from under the bar electrode 12 to complete a full length scan. This is the position shown in the drawing. In echo ranging it is at or near this point in the cycle that an incident pulse of sound or compressional wave energy should be projected. To this end a keying cam 32 is provided, mounted on the shaft 14 for rotation in fixed angular relation with the helix 10 and arranged to effect momentary closure of a normally open keying switch 33 at or near the zero point in the scanning cycle. Switch 33 is operated by the cam follower 34 which normally holds the switch open and permits momentary closure upon falling into a depression in the cam as shown. Where shorter ranges are being measured with echo signals being recorded only part way along the line of scan, it is desirable to effect a fly-back shortly after receipt of the desired echo signal and before expiration of the time required for completion of a full scanning line at the constant timing speed, thereby permitting maximum pulse repetition rate for a given range and scanning speed.

To accomplish this the shaft 14 is continued on to a controlled source of high speed motion, here shown in the form of a high speed electric motor 36, through a suitable gear train 37—38. This motor being normally deenergized permits rotation of the shaft 14 through the overdrive 23 solely by the constant speed motor 24 at the relatively low constant scanning speed. However, upon energization of the high speed motor the shaft 14 is rotated at a relatively high speed say several hundred r.p.m. in the same direction as before, as indicated by the adjacent arrow, and independently of the slow speed motor, due to operation of the overdrive 23 in known manner. To effect operation of the high speed motor 36 at any given point in the scanning cycle the shaft 14 carries a cam drum 40 splined on the shaft for rotation in fixed relation to the scanning helix and for sliding movement axially along the shaft. A raised cam portion 45 on the drum is provided with a straight line leading edge 39 parallel to the axis and a spiral trailing edge 41 forming slightly less than one complete spiral convolution about the drum. A cam follower 42 controls a normally open switch 43 in the high speed motor circuit 44, the cam follower operating to maintain the switch closed while riding on the low surface of the cam drum and to hold the switch open while riding upon the upper surface.

Operation of the above described system starting with the parts in the position shown is as follows. Here the drum is positioned axially along the shaft 14 so that the cam follower rests upon the cam drum about say two-thirds along the length of the drum representing about two-thirds of the maximum scanning length. The drum and scanning mandrel 13 are in the zero angular position with the scanning helix contacting the record sheet at the zero point 31 and the keying cam-follower 34 having just fallen into the depression in the keying cam 32, to effect transmission of a pulse of compressional wave energy through the transmitter 46 and transducer 20. Slight rotation of the keying cam 32 in the direction of the adjacent arrow opens the keying switch 33 to terminate the pulse. Rotation of the helix 10 effects scanning movement of its point of contact with the record sheet from left to right continuing as the sound pulse travels to a reflecting target and the echo returning produces a mark on the record sheet at the point of contact of the helix therewith. Assuming the target range is slightly less than say two-thirds that represented by a full length scanning line or complete turn of the helix, the record mark will be made before the cam drum 40 has made two-thirds of a revolution. Rotation of the cam drum 40 in the direction of the adjacent arrow for approximately two-thirds of a revolution from the zero point will bring the point 47 of the trailing edge 41 of the cam to the cam follower. The follower then drops onto the lower cam surface closing switch 43 to energize the high speed motor 36. This immediately boosts the speed of the shaft 14 to hasten completion of the scanning cycle back to the starting or zero point. Just before the zero point is reached the leading edge 39 of the elevated cam surface moves under the cam-follower 42 to open the switch 43 and deenergize the high speed motor. To prevent coasting past the zero point at the higher speed, means are provided for applying a braking action to the shaft. In the present embodiment this braking means is in the form of a centrifugal brake comprising a weight carrying element 48 mounted on the shaft 14 for rotation therewith and carrying a pivoted weight 49 arranged to swing out into engagement with a stationary brake block 51 only at the relatively high speed imparted by high speed motor 36. The brake block is of small angular extent and positioned in the path of the weight to apply the braking force momentarily just before the helix reaches the zero position shown in the drawing, say at an angular lead of about 25 degrees. It is to provide this space in the scanning cycle that the helix is made less than one complete convolution as mentioned above, the space of 25 degrees affording time for this switching and braking. It will be readily understood how by sliding the cam drum 39 along the shaft to left or right, the relative position of the cam-follower 42 and drum, axially of the drum, may be varied to vary the point on the trailing edge 41 across which the follower will ride and consequently the point in the scanning cycle at which the remainder of the cycle is speeded up to effect a fly-back. Where the full scanning length of the helix is to be used, the cam drum is slid along the shaft 14 to the left sufficiently to bring the continuous annular elevated surface portion 87 under the cam-follower 42. This maintains the switch 43 open throughout repeated scanning cycles permitting the recorder to operate in the known manner without adjustable fly-back. Adjustment of the cam drum to right or left is effected by movement of the fork bracket 52 through a rack and pinion drive 53 controlled from a fly-back control knob 54. While such a fork bracket arrangement is here shown by way of a simple diagrammatic illustration, it will be understood that adjustment of the time of fly-back may be effected by axial movement of either the cam or the cam follower and switch, and in any known or other suitable manner.

Where still shorter scanning periods and a higher repetition rate are desired as in short distance ranging, the constant driving speed for the scanning helix 10 and record feed 29 should be increased while preserving their ratio, and it is for this purpose that the two-speed change gear element 28 is placed between the constant speed motor 24 and the common driving shaft 27 for both scanning and record feed.

Figure 2:
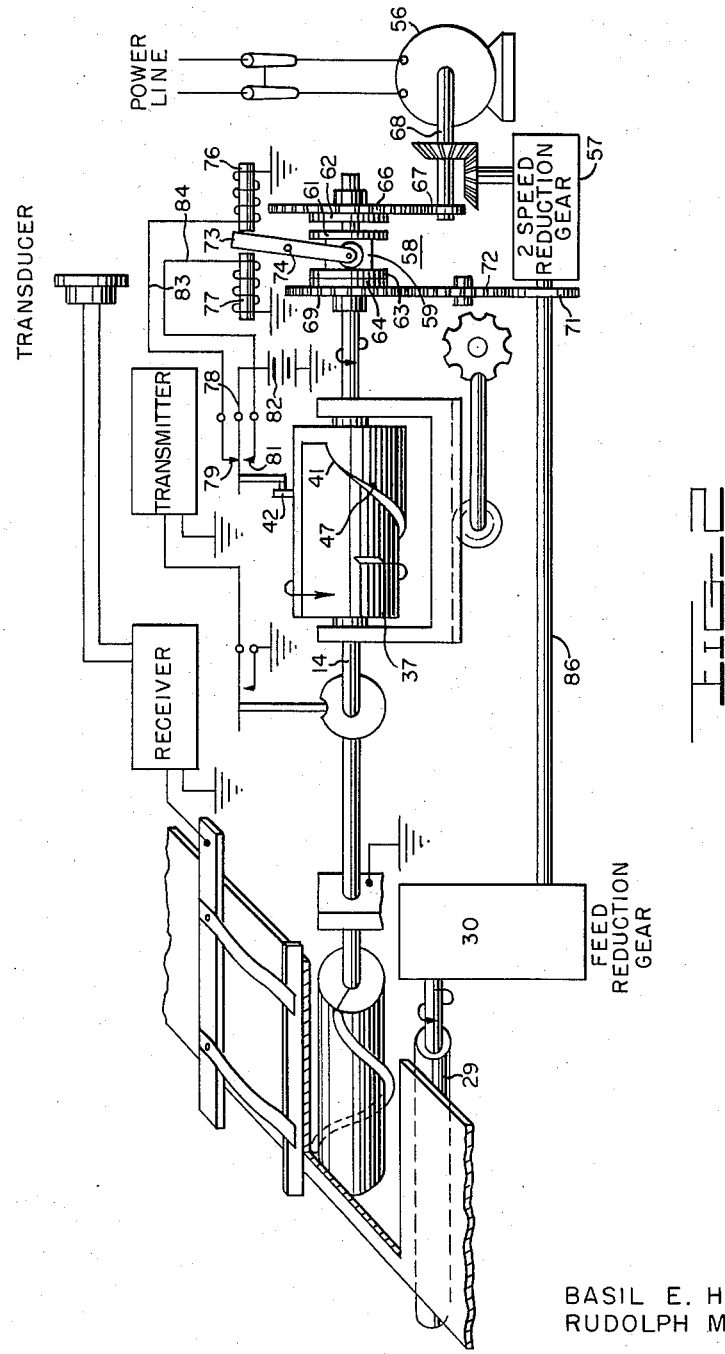
Figure 2 is a diagrammatic illustration of another embodiment of the invention using a common source of power for both scanning and fly-back movements.

Referring now to Figure 2, this is a diagrammatic representation of a modified form of the invention using a single source of motive power with electromagnetically controlled mechanical means for shifting from scanning speed to fly-back speed, other elements remaining substantially the same. Like parts in the two embodiments are designated by like reference numerals. Here the single electric motor 56 like the motor 24 of Figure 1, is a constant speed motor of any known or other suitable type, driving the helix mandrel 13 and record feed 29 at the desired constant relatively slow scanning speeds through a two-speed reduction gear 57, or at a greatly increased fly-back speed according to the position of a suitable two-way clutch element 58. The clutch element is comprised of a driven, double-face element 59 splined on the shaft 14 to permit alternate engagement of the pairs of driven and driving clutch face elements 61—62 and 63—64. Driving element 62 carried by gear 66 is mounted to rotate freely on the shaft 14 while held against axial movement thereon and is driven at the relatively high fly-back speed by the motor 56 through gear 67 fixed to the motor shaft 68. Driving element 64 carried by gear 69 is mounted to rotate freely on the shaft 14 while held against axial movement thereon and is driven at the relatively low scanning speed by the common motor 56 but through the two-speed reduction gear 57 and gear train 71—72. This double magnetic clutch element may be of any known or other suitable type capable of clutching the shaft 14 alternately to either one of two driving elements such as the two gears 66 and 69. For the sake of a clear diagrammatic showing, the driven clutch element 59 splined on the shaft 14 is shown as arranged to be slid on the shaft into engagement with either driving element by means of the usual forked roller arm 73 pivoted near the center as at 74 with its upper end serving as an armature for a pair of opposed actuating magnets 76—77. Thus energization of magnet 76 will slide the clutch element 59 to the left to effect engagement of clutch elements 63—64 and cause the shaft 14 to be driven at the desired constant scanning speed by the constant, low speed gear 69. On the other hand deenergization of magnet 76 and energization of magnet 77 will slide the clutch element 59 to the right to disconnect the shaft from gear 69 and connect it with the high speed gear 66 for driving the shaft at the fly-back speed.

Actuating magnets 76—77 are controlled by the position of the cam-follower 42 through a double throw switch element 78 having a normally closed contact 79 and a normally open contact 81. The term normally closed and normally open are here used in a relative sense in that the contact 79 remains closed except during fly-back while contact 81 is closed only for effecting the fly-back. The cam 38 and cam-follower 42 cooperate in the same manner as that described in connection with Figure 1 except that here in Figure 2 the follower 42 while riding on the high surface of the cam maintains contact 79 closed to hold the magnet 76 energized over a circuit which may be traced from battery 82, contact 79, conductor 83, magnet 76 to ground and back to battery. On the other hand the follower upon dropping over the trailing edge 41 of the cam onto the low cam surface opens contact 79 and closes contact 81 to deenergize magnet 76 and energize magnet 77 while riding on the low surface of the cam. This latter energizing circuit may be traced from battery 82, through contact 81, conductor 84 and magnet 77 to ground and back to the battery. While the current source for energizing the magnets 76—77 is here shown as a battery it will be understood that any known suitable source may be so utilized such as a low voltage power line of either direct or alternating current. In the case of the latter it will be understood that magnets 76—77 will take the form of alternating current relay magnets so as to respond to the energizing current without chattering. As in the arrangement of Figure 1 the output shaft of the two-speed reduction gear 57 is arranged to transmit constant speed motion through shaft 86 and a feed reduction gear 30 to the feed roller 29 for feeding the record sheet 11 along between the bar electrode 12 and the helical scanning element 10 at a given ratio to the scanning speed. As in the modification diagrammed in Figure 1, the system of Figure 2 uses the keying cam 32 operating through cam-follower 34 and switch 33 to effect transmission of a pulse of compressional wave energy each time the follower falls in the depression in the cam. This action takes place each time the apparatus assumes the position illustrated which is at that point in the scanning cycle where the extreme left hand end of the helix 10 arrives under the electrode 12.

It will be noted that in the embodiment of Figure 2 the use of the two-way clutch device 58 in cooperation with the cam 39 and double throw switch 78, eliminates necessity for the brake device 48 and overdrive device 23 of the arrangement of Figure 1. However it is to be noted that in the system of Figure 2 operation of the two-way clutch for switching mechanically from low to high and back to low speed, requires considerably more time than the speed shifting arrangement of Figure 1 due to inertia of parts. For this about 90 degrees of the cycle is allowed by making the helix 90 degrees less than one complete convolution.

While certain preferred embodiments of the invention have been herein shown and described for the sake of disclosure, it is to be understood that the invention is not limited to such specific embodiments but contemplates all such modifications and variants thereof as fall fairly within the scope of the appended claims.

The invention described herein may be manufactured and used by or for the Government of the United States of America for governmental purposes without the payment of any royalties thereon or therefor.

What is claimed is:

1. In a helical recorder having a rotatable scanning helix of substantially one convolution and a cooperating straight bar element whereby rotation of the helix moves a point of juxtaposition of the helix with the bar along the bar from a starting point to a terminal point and back to the starting point to complete a scanning cycle each revolution, the combination of constant low speed driving means for rotating the helix at a predetermined scanning speed, high speed driving means for rotating the helix at a relatively high speed, means for switching driving connection of the helix from one driving means to the other, timing means for the switching means operated in synchronism with rotation of the helix to shift from low to high speed at an intermediate point in the cycle to hasten completion of the cycle and to shift from high to low slightly before the start of a new cycle, and means for adjusting the timing means to vary the said intermediate point at which shift from low to high takes place.

2. In a helical recorder having a rotatable helical scanning element of substantially one convolution whereby each revolution of the helix completes a scanning cycle from a starting point through the cycle and back to the starting point, the combination of a relatively low constant speed driving means, a relatively high speed driving means, means for shifting driving connection of the helix from the low to the high speed driving means, control means for said shifting means responsive to occurrence of a given point in the cycle to hasten completion of the cycle to the next starting point and means for adjusting the control means to vary the point in the cycle at which the shift from low to high speed takes place.

3. In a helical recorder having a rotatable helical scanning element of substantially one convolution whereby each revolution of the helix completes a scanning cycle from a starting point in the cycle and back to the starting point, high and low speed driving means for the helix, timing means synchronized with rotation of the helix for switching driving connection of the helix from the low speed driving means to the high speed driving means at a given angular position of the helix intermediate the starting points of two successive cycles and switching driving connection to the low speed at a point in the cycle shortly before the starting point of the next succeeding cycle.

4. In a helical recorder having a rotatable, helical scanning element of substantially one convolution cooperating with a straight line electrode bar arranged parallel to the axis of the helix with an interposed electrical sensitive record sheet, and means for rotating the helix about its axis at a given constant angular velocity through a complete scanning cycle from a starting point where one end of the helix is juxtaposed with the electrode bar to where the other end of the helix is juxtaposed with the bar and back to the starting point, the combination of means for projecting a pulse of compressional wave energy, keying timing means synchronized with rotation of the helix for controlling the projecting means to effect the projection of a pulse of wave energy near the starting point in the cycle, means for driving the helix at increased speed and adjustable fly-back timing means synchronized with rotation of the helix for maintaining driving connection of the helix with the increased speed driving means from a given point in the cycle after the starting point to a subsequent point in the cycle near the next starting point, said fly-back timing means being adjustable to vary the given point in the cycle at which the increased speed starts.

References Cited in the file of this patent
UNITED STATES PATENTS

| 2,572,546 | Walton | Oct. 23, 1951 |
| 2,617,094 | Tinus | Nov. 4, 1952 |
| 2,623,116 | Rymes | Dec. 23, 1952 |